(No Model.)

J. SAVIDGE.
DREDGING MACHINE.

No. 257,617. Patented May 9, 1882.

WITNESSES
T. E. Brecht
W. E. Chaffee

INVENTOR
Jeremiah Savidge,
By Wm. Henderson
Attorney

N. PETERS, Photo-Lithographer, Washington, D. C.

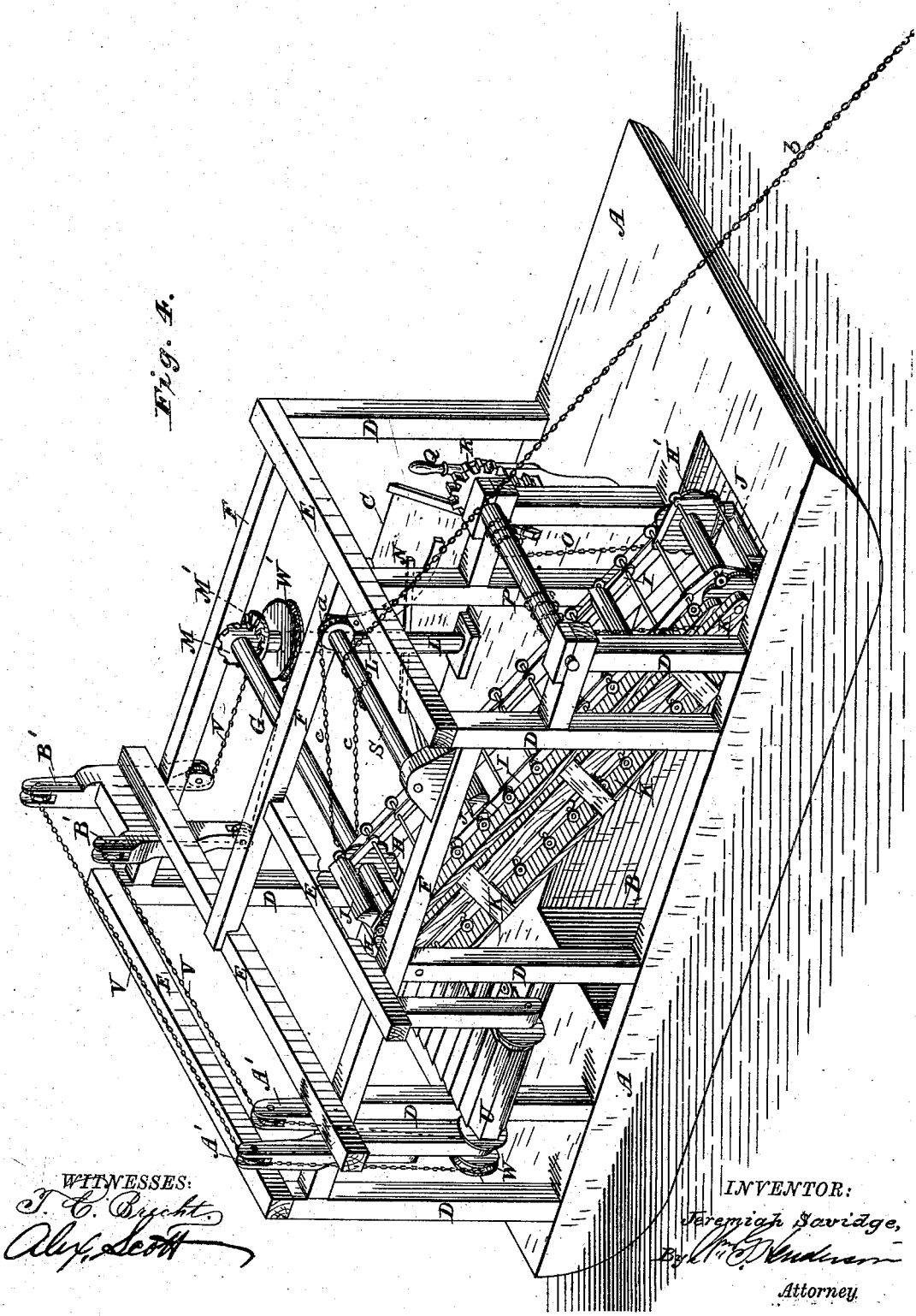

UNITED STATES PATENT OFFICE.

JEREMIAH SAVIDGE, OF SUNBURY, PENNSYLVANIA.

DREDGING-MACHINE.

SPECIFICATION forming part of Letters Patent No. 257,617, dated May 9, 1882.

Application filed February 2, 1882. (No model.)

*To all whom it may concern:*

Be it known that I, JEREMIAH SAVIDGE, a citizen of the United States of America, residing at Sunbury, in the county of Northumberland and State of Pennsylvania, have invented certain new and useful Improvements in Dredging-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1:
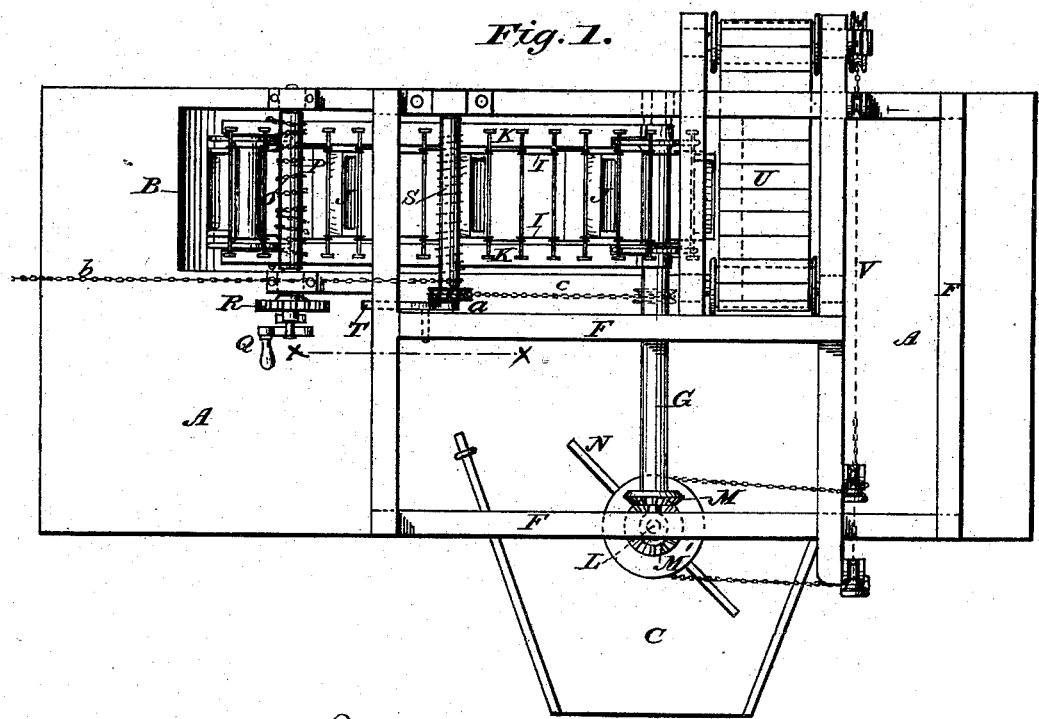
Figure 2:
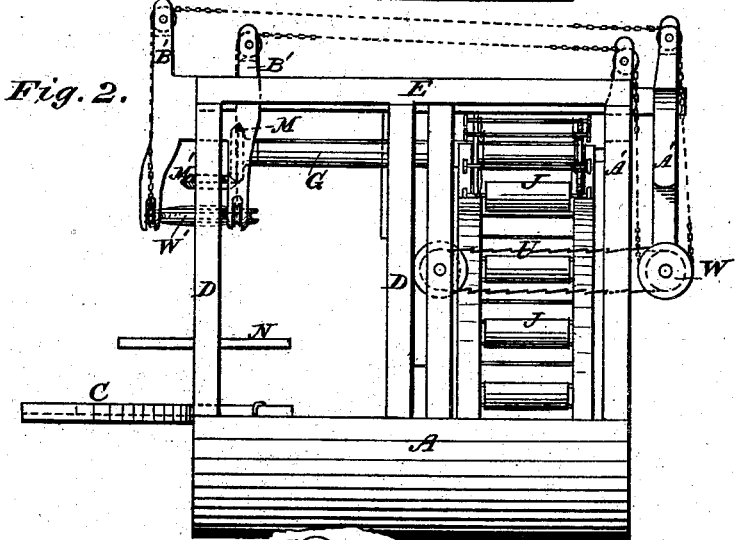
Figure 3:
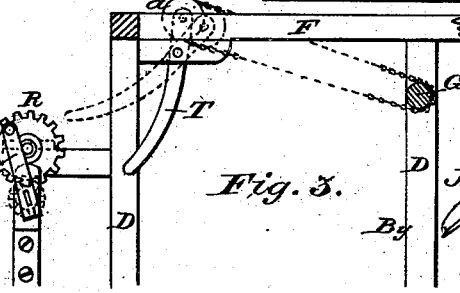

Figure 1 is a plan view of the machine; Fig. 2, an end elevation, and Fig. 3 a vertical section on the line $x\ x$ of Fig. 1, parts of the machine being broken away; and Fig. 4, a perspective of the machine.

My invention relates to dredging-machines; and it consists in the combination of parts hereinafter particularly described, and then sought to be specifically defined by the claims.

In the accompanying drawings, the letter A indicates the float or scow which carries the machinery. It is formed with a well, B, for the passage of the traveling buckets, and from one side there extends a platform, C, for the horse, the platform being removable. The float or scow carries a frame-work composed of the upright, transverse, and longitudinal bars D, E, and F. A driving-shaft, G, provided with a pinion, M, at one end, extends across the scow, being journaled in the framework thereof, and to that portion of it above the well B are rigidly secured two sprocket-wheels, H, on which works the endless chain I, to which the dredging-buckets J are secured. To the same portion of the driving-shaft a frame, K, is hinged by its upper end, so that the lower end can be raised or lowered in the well. The lower end of this elevating-frame has two sprocket-wheels, H′, journaled therein, so that the endless bucket-chain I will fit over and work thereupon the same as on the upper sprocket-wheels. The bucket-chain thus applied when operated will ascend along the top face of the frame and descend along its lower face. The bucket-chain is raised and lowered by the drive-shaft G, which is revolved by the upright shaft L, which has a pinion, M′, at its upper end, that meshes with the pinion M, and is turned by animal power, the horse being hitched to the bar N, which extends out from the shaft.

The lower end of the bucket-frame is raised or lowered by means of a rope or chain, O, which is connected to the lower end of the frame and passed up over a shaft, P, journaled in the main frame, and which is revolved by a hand-crank, Q, which turns a pinion that meshes with a toothed wheel, R, keyed to the end of the shaft. The chain winds around the shaft, and a removable pin fits into the end of the shaft, so that the crank will fit against the pin and hold the frame at whatever elevation desired.

A shaft, S, provided with a pulley, $a$, near one end, is journaled at one end in a block secured to one of the longitudinal bars of the main frame, and at the other end in one end of a lever, T, pivoted to a block secured to the under side of another longitudinal bar opposite the first one. When the shaft is thus journaled it is over the bucket-frame, and one end can be moved in a horizontal plane, so as to tighten or slacken a chain, for a purpose hereinafter to be stated. A rope or chain, $b$, connected to this shaft, has an anchor secured to its other end, and when the anchor is thrown ahead of the float or scow and the shaft revolved the chain is wound around the shaft and the scow moved forward.

In order that the scow may be moved forward and the dredging-buckets operated at the same time and by the same means, a rope or chain, $c$, is passed around the pulley $a$, and around the drive-shaft G or a pulley thereon, so that the revolution of the drive-shaft will be communicated to shaft S. When, however, it is desired to operate the buckets without moving the scow, the lower end of lever T is raised, which movement throws the pulley end of shaft S nearer to the drive-shaft and slackens the chain $c$, so that the revolution of the drive-shaft will not be communicated to the anchor-shaft. The lever will be held to any adjusted position by a pin passed into the upright bar just in front of it; but any other means may be used for the purpose. When the sand or other matter is raised to the top of the bucket-frame it is discharged from the buckets onto an endless apron, U, which moves at right angles to the bucket-chain and delivers the sand into a scow or other vessel alongside the machine-scow. This endless delivery-apron is operated by a rope or chain, V, passed over a pulley, W, then upward and over two sheaves in the posts A', then across the machine and over two sheaves in the posts B', then downward and over two sheaves in the lower ends of the same posts at right angles to the upper sheaves, and then around a pulley, W', on the upright shaft L.

It will be seen that by the arrangement described the buckets for raising the sand, the endless apron for delivering it from the machine, and the means for moving forward the scow are all operated by the same power and at the same time.

There are changes that can be made without departing from the spirit of my invention, such changes being immaterial and readily suggesting themselves to the mind of a skilled mechanic, and therefore need not be particularly specified here; but, Having described my invention, what I claim is—

1. In a dredging-machine, the combination, with the endless chain of buckets and the delivery-apron U, of the horizontal drive-shaft G, upright shaft L, gearing therewith and provided with pulley W', posts A' and B', provided with sheaves, and endless chain V, passing over said sheaves and over pulleys W' W on the shaft L and shaft of apron U, respectively, substantially as and for the purposes set forth.

2. In a dredging-machine, the combination of a chain of elevating-buckets, a delivery-apron at the end of the chain of buckets, an anchor-chain shaft, S, journaled at one end in the pivoted lever T, a horizontal shaft, G, connected to shaft S by chain c and to the chain of elevating-buckets, and upright shaft L, connected to a shaft of the delivery-apron by an endless chain and to shaft G, and operating the said several parts, substantially as set forth.

In testimony whereof I affix my signature in presence of two witnesses.

JEREMIAH SAVIDGE.

Witnesses:
  GEO. H. NEFF,
  CHARLES O. EVANS.